US005488713A

United States Patent [19]
Norton et al.

[11] Patent Number: 5,488,713
[45] Date of Patent: Jan. 30, 1996

[54] COMPUTER SIMULATION TECHNIQUE FOR PREDICTING PROGRAM PERFORMANCE

[75] Inventors: Richard L. Norton; Karen J. Norton, both of Colorado Springs, Colo.

[73] Assignee: Digital Equipment Corporation, Maynard, Mass.

[21] Appl. No.: 98,757

[22] Filed: Jul. 28, 1993

Related U.S. Application Data

[63] Continuation of Ser. No. 457,325, Dec. 27, 1989, abandoned.

[51] Int. Cl.6 ................................................ G06F 9/455
[52] U.S. Cl. ........................ 395/500; 364/DIG. 1
[58] Field of Search ................................ 395/500, 550, 395/575, 650

[56] References Cited

U.S. PATENT DOCUMENTS

| | | | |
|---|---|---|---|
| 4,253,145 | 2/1981 | Goldberg | 395/500 |
| 4,638,427 | 1/1987 | Martin . | |
| 4,811,276 | 3/1989 | Suga | 395/575 |
| 4,860,190 | 8/1989 | Kaneda et al. | 364/200 |
| 4,885,681 | 12/1989 | Umeno et al. | 364/200 |
| 4,975,836 | 12/1990 | Hirosawa et al. | 364/200 |
| 5,023,771 | 6/1991 | Kishi | 395/550 |
| 5,047,919 | 9/1991 | Sterling et al. | 364/200 |

Primary Examiner—William M. Treat
Attorney, Agent, or Firm—Arnold, White & Durkee

[57] ABSTRACT

Methodology for simulating programs on a single processor host workstation to accurately predict their performance on a target system including multiple processors, including timing interdependent processes and arranging and paralleling the measured times.

25 Claims, 3 Drawing Sheets

FIG_1_

FIG_2_

COMPUTER SIMULATION TECHNIQUE FOR PREDICTING PROGRAM PERFORMANCE

This application is a continuation of application Ser. No. 07/457,325, filed Dec. 27, 1989, now abandoned.

FIELD OF THE INVENTION

The present invention relates to program development techniques for computer systems employing shared memory multiprocessors, or symmetric multiprocessors (SMP's), and more particularly to techniques for dynamically simulating processing times for SMP application programs tested on a host uniprocessor workstation.

BACKGROUND OF THE INVENTION

In order to develop application programs for SMP's, it is desirable to dynamically test the newly written application programs to determine their performance, and modify them if necessary to improve their performance. It is also desirable to develop such programs on a single processor workstation to free the SMP system from being diverted to program development purposes. The programs may then be improved to minimize data dependence, inter-process communication costs, and excess overhead due to ineffective utilization of the available SMP's.

The performance of software systems running on SMP systems have commonly been determined by simulation techniques. Simulation techniques according to the prior art have relied upon user provided estimates of the cost of various operations that are being simulated. While this is an effective technique when these estimates are both known and constant, it is not a viable technique for those costs that are not known at compile time or which depend on a routine data dependence in the system. It includes a high resolution virtual timer system for actually timing the execution of the processes as they execute. The execution times of the processes and I/O systems used in these systems are estimated values. Estimated values of the process execution times are difficult to ascertain, particularly with a combination of independent and parallel processing of the processes with the different SMP's.

SUMMARY OF THE INVENTION

The present invention works by actually timing the process runs through assigned states with a scheduler system described, and combining the process run timings and I/O system simulated timings from an associated run time library in the correct sequence to accurately predict parallel processing times for a target single or SMP system with a host single processor workstation.

DESCRIPTION OF THE PREFERRED EMBODIMENT

The simulation system according to the present invention uses a process scheduler system in combination with a run time library of simulation model routines which simulate the performance of SMP systems running programs with interdependent processes and data dependence on a single processor workstation. The scheduler assigns the different processes of a program to different process states, implemented with a queue for each state. Process descriptions for each process queued into the appropriate states include essential information about the corresponding process. The scheduler decides which processes to run in which order according to the queue process descriptions. The scheduler also diverts the executing processes to a sleep state when execution of other processes are to intervene before its completion, and to a blocked state when an event, such as availability of a processor, must intervene.

The simulation system according to the present invention characterizes the I/O system, dynamic instruction path length, and overhead process management for an SMP program by simulating the application. The I/O system performance is characterized by detailed simulation of the I/O path. The instruction path length is dynamically measured by a high resolution virtual timer system. The system overhead is accounted for by letting the measurement take place in the run time library as well as in the user code for the program.

In order to implement process creation, the I/O system, and process scheduling for a program on an SMP system, it is necessary to access a run time library of routines that support a concurrent program execution model appropriate to the particular SMP system. This parallel processing library then expresses the concurrent programming model of the targeted SMP system.

Programs that have a significant amount of I/O can be very sensitive to data placement on disc media. To accurately reflect this, the simulation includes a detailed I/O model of disc media that accurately accounts for disc rotational position and head position. The simulation system has control over all I/O requests. When a request arrives, the process doing the I/O is stalled, in simulated time, for the time required to move the simulated read/write head to the appropriate track, and the rotational and transfer delays are also accounted for. Consequently, the user code performing the I/O will advance during the I/O by an amount commensurate with the required simulated device positioning time.

To characterize the processor performance on the target system, the dynamic instruction path length of program processes is measured while the program is running, and the program is put to sleep for the amount of time each process would have taken on the target processor. This is done by timing each of the processes with a high resolution virtual timer system that runs only when the embedded simulation system is running user code. The timer system stops during host system I/O operations, interrupts and system calls. Consequently, the time determined by the timer system is directly related to the average instruction execution rate.

The simulated target time advances according to the following formula, where Δ host is the virtual time that has passed during the last scheduling quanta for the tested program.

$$\Delta \text{ target} = \frac{\text{host processor speed} * \Delta \text{ host}}{\text{target processor speed}}$$

An important feature of the embedded simulation, as implemented by the simulation system according to the present invention, is that the order of resources available or allocated is faithful to the target system. When a process of a program is put to sleep to account for having executed some number of instructions, it holds all resources, including the simulated processor which has been allocated for the process. Therefore the simulated time that a resource is acquired or released by the program is accurate relative to the length of the path that the program takes.

The simulation system also includes a scheduler that behaves as if it were running on the target SMP system rather than a single processor host. This is achieved by defining some system characteristics for the target system and then automatically timing path lengths for processes of the program with a high resolution virtual timer system.

The simulation system assumes that the target system comprises the I/O system devices and the processors. Thus, the scheduler will not run a process unless there is a simulated processor available. If there is no simulated processor available, then the process is blocked until it can get one. Similarly, a process is blocked if it cannot acquire a device for I/O. In this way, the policy of the SMP target system is emulated so that the sequence of process blocking and unblocking in the simulation is faithful to the target system.

The characteristics of the target system are specified by a boot file which is interrogated by the simulation system. The boot file specifies the number of processors with their speeds, and also the number of disc devices with their detailed characteristics. The specification of the disc devices includes details of the disc geometry so that translation from disc block number to physical position in terms of track and sector can be performed. The seek performance of the discs is also provided in the boot file in the form of a table of times required for different numbers of tracks to seek. When a seek operation is simulated by the system, the table is used to determine the simulated seek time. The boot file also specifies the interprocess communication (IPC) bandwidth between processors which is available for queues.

The virtual timer system times only a particular process in a time sharing environment. For embedded simulation the timer should have sufficient resolution to accurately measure code sequences as small as three to five instructions. This resolution is necessary to measure the shortest path that a simulated process may run before blocking.

Embedded simulation predicts how software will run on "different" hardware hosts. "Different" hosts may mean a processor of a different speed, more processors, or more processors of different speeds. The technique works by measuring computation time on the simulation in the host and then scaling this time to project how long that would take on a target system. Of course, this projection alone only predicts how the computation speed will change on a different system. Delays caused by retrieving data or waiting for an event are considered below. Likewise, parallel processing by multiple processors is not accounted for. Simulation of parallel processing with a SMP system is described in detail below.

The present invention allows a single processor host workstation to simulate program runs on a target single or SMP system with a process scheduler system and associated run time library and including a high resolution virtual timer system to measure the simulated run times of each process in the simulated program.

Figure 1:
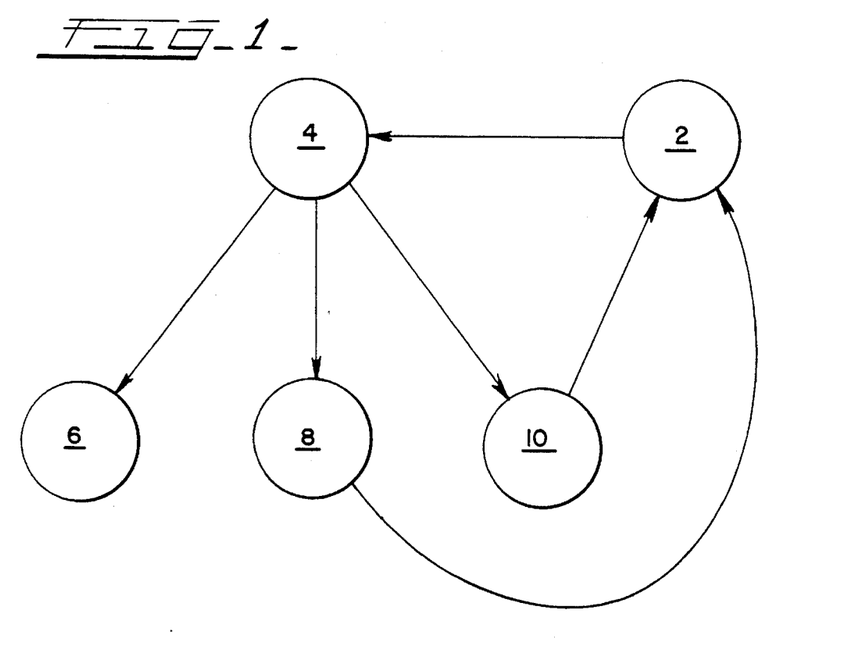
FIG. 1 is a state diagram for a typical simulation system suitable for incorporating the present invention.

The timer system is incorporated into a program simulation system comprising a process scheduler in combination with a run time library of simulation model routines. The process scheduler assigns different processes of programs to be run on a target SMP system into different states simulating those that the different processes of the program cycle through in an actual run on the target system. As part of the simulation process, the program includes the boot file described above that includes important data which characterizes the simulated system, such as the number of processors and their speeds, and also the number and types of disc devices and their detailed characteristics. A special call at the beginning of the program commands the boot file to be interrogated. The simulation system then transfers each process in the program between different states to simulate the execution of the entire program on the host processor according to the characteristics of the target system. Referring to the drawings, wherein like reference characters designate like or corresponding parts throughout the views, FIG. 1 is a state diagram for the simulation system suitable for incorporating the present invention. Processes of the program to be simulated that are in a ready state 2 are transferred to an executing state 4 by the process scheduler. The process scheduler then advances the processes to one of three states, depending on the simulation conditions of the target system described in the boot file.

If the process is to be completed, the scheduler transfers the process from the executing state 4 to a done state 6. If the process is one which must await the completion of another process, such as a child process, the scheduler transfers the process from the executing state to a sleep state 8. If the process is awaiting the occurrence of an event, such as the availability of a simulated processor, the scheduler transfers the process from the executing state 4 to a blocked state 10.

When a process in the sleep state 8 is ready to awake because a corresponding child process has been completed, the scheduler transfers the process from the sleep state 8 back to the ready state 2. Likewise, when a process in the blocked state 10 is to unblock after the occurrence of an unblocking event, such as the availability of a simulated processor, the scheduler transfers the process from the blocked state 10 back to the ready state 2.

The scheduler actually transfers process descriptors for each of the processes into the queues for each of the states 2, 4, 6, 8, 10. A process descriptor for a process is a data structure that contains information about that process, such as its name, its identifier, the identifier of its parent process, if any, a pointer to its associated code, the number of child processes it has, if any, and other information about its state.

Figure 2:
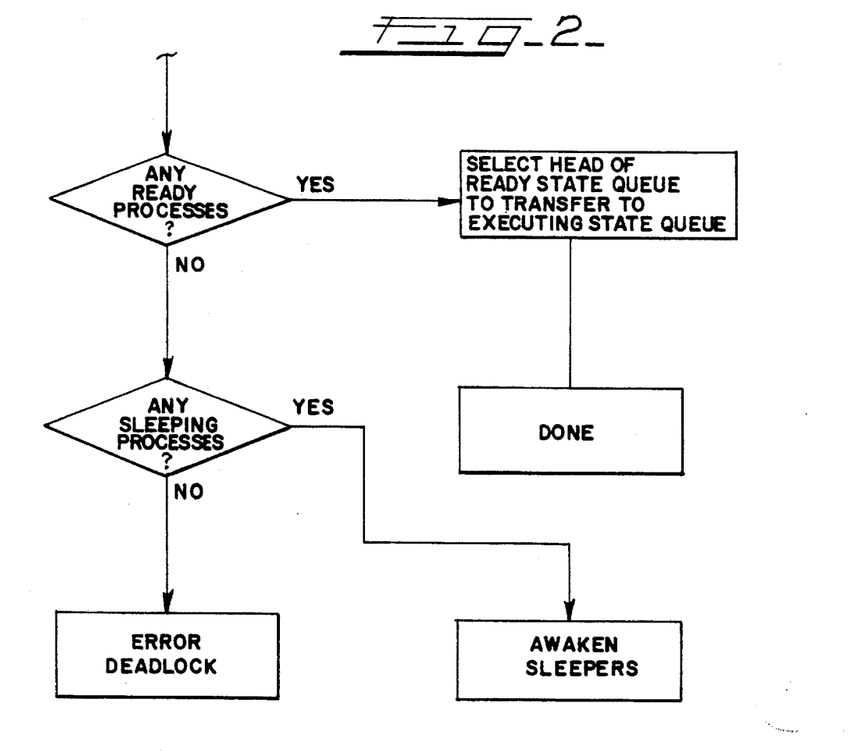
FIG. 2 is a flow chart of the decision making process for the scheduler in the simulation system according to the present invention.

The scheduler has to decide which process to run after the execution of a preceding process based upon the target system characteristics defined in the boot file. That is, the scheduler decides which process descriptor to transfer from the queue for the ready state 2 to the queue for the executing state 4. FIG. 2 shows a flow chart of the scheduler decision making process. The scheduler first checks to see if there are any processes having their corresponding process descriptors in the queue for the ready state 2. If there are, the scheduler selects the process descriptor at the head of the queue for the ready state 2 and transfers it to the queue for the executing state 4. This places the process with this process descriptor in the executing state 4 to let the process complete its execution. After the process execution is complete, the scheduler returns to the queue for the ready state 2 and checks to see if there are any more processes having their corresponding process descriptors in the queue for the ready state 2. If there are, it continues operating as described above.

If there are no more process descriptors in the queue for the ready state 2, the scheduler checks to see if there are any processes having their corresponding process descriptors in the queue for the sleep state 8. If there are none, the scheduler indicates an error or deadlock condition. If there are process descriptors in the queue for the sleep state 8 the scheduler awakens the sleeping processes in the order of the position in the queue for the sleep state 8. The process identifiers in the queue for the sleep state 8 are arranged according to a sleep pointer in the process descriptor for each of the processes. The scheduler then transfers the process identifiers of the awakened processes into the queue for the ready state 2 so that the awakening processes are thereby put in the ready state 2. The scheduler then returns to the queue for the ready state 2 and checks to see if there are any more processes having their corresponding process descriptors in the queue for the ready state.

The processes to be transferred from the executing state 4 to the sleep state 8 or the blocking state 10 are so identified in their process descriptors. Generally, the processes that are to be put in the sleep state 8 are those that are awaiting the execution of child processes or processes simulated to be executing concurrently. The processes that are to be put in the blocking state 10 are generally those that are awaiting the occurrence of an event, such as the release of a simulated processor on which another process is executing.

The high resolution timer system measures the time elapsed for each process between the time it is transferred to the execution state 4 until the time is transferred from the execution state 4. As each process transfers to the execution state 4, the scheduler searches for an available virtual processor in the simulated target processor system. Available processors in the target system may have different speeds than the host processor. If no virtual processor is available, the scheduler transfers the process from the execution state 4 to the blocking state 10 to await the availability of one of the virtual processors. This condition happens when there are more concurrently running processes in the program than there are available virtual processors. It also happens when the host processor system is simulating a target system which also has a single processor, but has another speed, for instance.

After the scheduler selects an available virtual processor as the simulated target processor, the simulation system accounts for any difference between the host processor and the corresponding simulated processor. The simulated execution time of the process on the selected simulated processor is the elapsed time of execution of the process while in the execution state 4 as measured by the high resolution timer system, adjusted to reflect the difference in speeds between the host processor and the simulated processor. For instance, if the host processor has a speed which is half of that of the target simulated processor, the simulated time for execution of the process on the simulated processor will be half of the time that the high resolution timer system actually measures the process running on the host processor.

As each process is transferred to the execution state 4, the timer system reads its clock. After the process transfers out of the execution state 4, the timer system reads its clock again. The elapsed virtual time on the host processor is the difference in these two clock readings. The simulated elapsed time is the virtual elapsed time adjusted for the difference in processor speeds, as described above. The simulated elapsed time is then stored in the associated process descriptor for the process.

Of course, all this occurs as the program is simulated on a single processor workstation. Because of this, the various processes in the program have to be run sequentially, even though they may be simulated as running concurrently on a simulated target multiprocessor system. Consequently, as each process runs on the host processor, the scheduler keeps track of which of the simulated processors are simulated to be unavailable because they are simulated to be executing at least some of the processes concurrently.

When there are more processes having their process descriptors in the queue for the ready state 2 than there are available virtual processors to execute the processes, the scheduler will still transfer process descriptors of the processes to the queue for the execution state 4. However, the scheduler will then immediately transfer these process descriptors to the queue for the blocking state 10. As executing processes release the simulated processors to which they have been assigned, the release of these processors serve as events to let the scheduler to transfer the process descriptors of the processes in the queue for block state 10 back to the execution state 8.

The simulated time of the program on the simulated target system is only computed as each process is actually completed. Upon transfer of each process in the program from the execution state 4 to the done state 6, the simulated elapsed time of the process stored in its process descriptor is added to the total simulated time of the program. In this way, the simulated time only advances in steps, upon the event of the completion of each process in the program.

For example, a program is simulated to run on a single target processor system using a host processor having a speed that is half of the target processor. The program comprises a parent process A with two child processes, a process B and a process C. The parent process A includes a special call to interrogate the boot file to determine the characteristics of the target system on which the program is to be simulated. In this case, the boot file describes a target system with a single processor having twice the speed of the host processor. The process A also includes special calls to indicate that both the processes B and C are children of the process A, and that the completion of the process A follows the execution of both the processes B and C. The processes A, B and C also include special simulation execution exiting calls. When run on the host processor, the parent process A takes 4 microseconds to execute, process B takes 8 microseconds, and process C takes 10 microseconds.

If the simulation system begins running the program on the host processor, the scheduler arranges the process descriptors of the processes A, B, and C in the queue for the ready state 2, with the process descriptor for the process A at the head of the queue. The scheduler then transfers the process descriptor of the process A to the queue for the execution state 4. The timer system reads its clock and begins timing the execution of the process A at on initial time $T_o$. The process A completes its execution at a time $T_o+4$ microseconds. The timer system reads its clock and begins timing the execution of the process A at an initial time $T_o$. The process A completes its execution at a time $T_o+4$ microseconds. The timer system reads its clock again as the scheduler transfers the process descriptor of the process A from the queue of the execution state 4 to the sleep state 8. The simulation system calculates the virtual elapsed time for the execution of the process A as the difference in clock readings, or 4 microseconds. The simulation system adjusts the virtual elapsed time for the execution of the process A on the host processor to the difference in speeds between the host processor and the simulated processor of the target system on which the program is simulated. Since the target processor is twice as fast as the host processor, the simulated execution time is half of the virtual execution time. Therefore, the simulated elapsed time of 2 microseconds is stored in the process descriptor for the process A. This simulated elapsed time serves as the sleep time for the process A in the queue of the sleep state 8.

The scheduler then transfers the process descriptor of the process B from the queue of the ready state 2 to the execution state 4. However, since the simulated time is still $T_o$, and the parent process A has control over the single processor until a simulated time of $T_o+2$ microseconds, the scheduler transfers the process B to the block state 10 to await release of the processor. Simulated time remains at $T_o$.

The scheduler thus transfers the process descriptor of the process C from the queue of the ready state 2 to the execution state 4. However, since the simulated time is still $T_o$, the parent process A still has control over the single processor until the simulated time of $T_o+2$ microseconds. The scheduler then transfers the process descriptor of the process C into the queue of the block state 10 without letting process C execute to await availability of the processor after process B.

At this point, the queue for the ready state 2 is empty. Therefore, the scheduler transfers the process descriptor of the process A from the sleep state 8 to the execute state 4. The scheduler advances the simulated time to the sleep time stored in the process descriptor, $T_o+2$ microseconds, and the scheduler then transfers the process descriptor of the process A to the done state. The processor is then free, which lets the scheduler transfer the process descriptor of the process B from the queue of the blocking state 10 to the execute sate 4. The timer system measures the virtual elapsed time of the process B as described above for the process A, and since the process B is not a parent, the scheduler transfers the process descriptor of the process B to the done state 6. The simulation system adjusts the actual elapsed time, 8 microseconds, to a simulated elapsed time of 4 microseconds. The simulation system then advances the simulated time by 4 microseconds, to $T_o+6$ microseconds.

Figure 3:
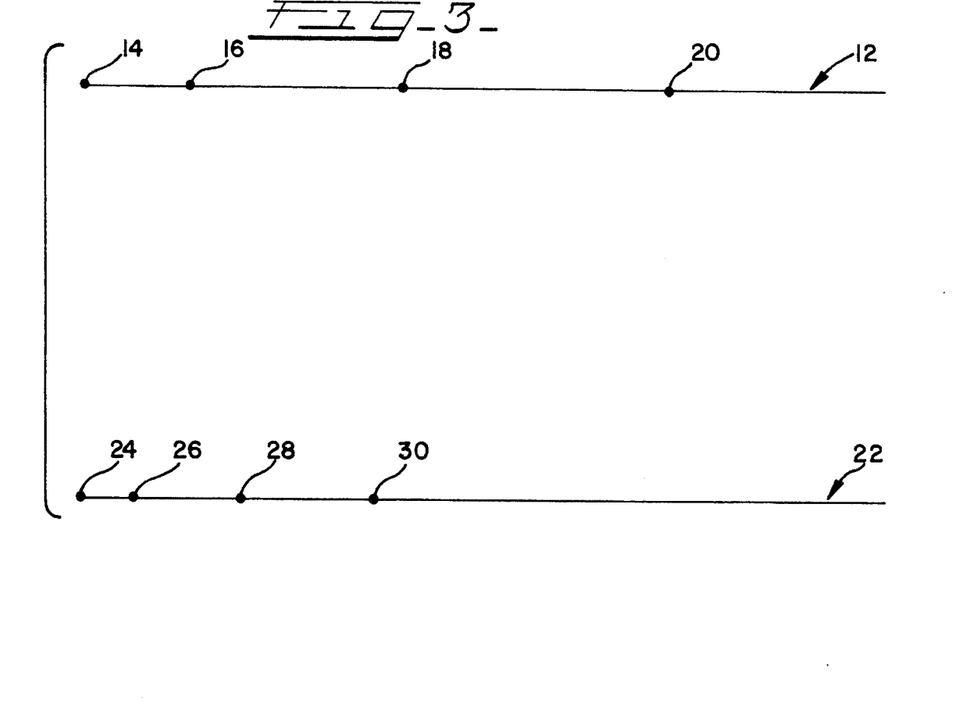
FIG. 3 is a graphical representation of actual and simulated execution times of a program executed on a host processor for a targeted single processor system with a processor having a different speed than the host processor.

This example is illustrated in FIG. 3, which is a graphical representation of the actual and the simulated program execution times on the host processor. Line 12 represents the virtual time program execution of the simulated program on the host processor. Point 14 represents $T_o$, the time at which the program is begun. Point 16 represents $T_o+4$ microseconds, the time at which the process A is completed and the process B starts. Point 18 represents $T_o+12$ microseconds, the time at which the program B is completed on the host processor and the program C starts. Point 20 represents $T_o+22$ microseconds, the time at which the program C is completed on the host processor.

Line 22 represents the simulated time program execution measured by the simulation system. Point 24 represents $T_o$, which is the time at which the simulation system calculation time begins, as well as the point at which the program simulation begins. Point 26 represents $T_o+2$ microseconds, the time at which the simulation system calculates the end of the process A and the start of the process B. Point 28 represents $T_o+6$ microseconds, the time at which the simulation system calculates the end of the process B and the start of the process C. Finally, point 30 represents $T_o+11$ microseconds, the time at which the simulation system calculates the end of the process C and the end of the program. The simulation system thus calculates that the program which is simulated on the host processor, and takes 22 microseconds to run, will take 11 microseconds on the target processor.

As another example, assume that the target system to be simulated is a three processor system, each of the processors having the same speed as the host processor. With the same program described above, having the parent process A and the child processes B and C, parallel processor simulation is possible. The special program instructions for simulation in the processes A, B and C are the same as in the example described above, but the target system characteristics stored in the boot file represent a three processor system with each processor having the same speed as the host processor. Just as in the example described above, the scheduler transfers the process descriptor of the process A from the head of the queue for the ready state 2 to the execution state 4. The process A then executed from the initial time $T_o$ to $T_o+4$ microseconds. However, in this case the processors of the target system have the same speed as the host processor, so that the simulation system conversion leaves the virtual elapsed time of process A for the simulation unchanged. The simulated elapsed time is the same as the actual elapsed time, 4 microseconds. Since process A is a parent, the scheduler transfers the process descriptor for the process A from the execution state 4 to the sleep state 8. The simulated elapsed time of 4 microseconds is stored in the process descriptor, and this stored time is once again treated as the sleep time for the process A. The simulated time is still $T_o$.

The scheduler then transfers the process descriptor of the process B from the queue of the ready state 2 to the execution state 4. Because there are three simulated processors in this example, the process B is allowed to execute, and the scheduler transfers the process description for the process B from the queue for the execute state 4 to the done state 6.

The timer system measures the virtual elapsed execution of the process B time as described above. The simulated elapsed time is once again the same as the virtual elapsed time, 8 microseconds, and the simulation system stores the simulated elapsed time of the process B in its process descriptor as sleep time. Since the target system includes multiple processors, thereby permitting parallel processing, the scheduler then transfers the process descriptor of the process B from the queue of the execution state 4 to the sleep state 8. The simulated time is still $T_o$.

The scheduler then transfers the process descriptor of the process C from the queue of the ready state 2 to the execution state 4. Although two of the three processors simulated for the target system are assigned to the already executed processes, one to the process A and the other to the process B, the third simulated processor is still available. Therefore, the process C executes, and the timer system measures the elapsed time of its execution. The simulation elapsed time is again the same as the actual elapsed time, 10 microseconds, because the speed of the simulated processor in the target system is the same as the host processor. Since the target system includes multiple processors to permit parallel processing of the processes A, B and C simultaneously, the scheduler then transfers the process descriptor of the process C from the queue of the execution state 6 to the sleep state 8. The simulated time is still $T_o$.

At this point no more process descriptors are in the queue for the ready state 2. The scheduler transfers the process identifier from the head of the queue for the sleep state 8 to the execution state 4. The process identifier at the head of the queue for the sleep state 8 is that for the process A in this case, because the process descriptors are stored in the queue in chronological order. Since the sleep time for the process A is only 4 microseconds, instead of 8 microseconds for the process B and 10 microseconds for the process C, the process descriptor for the process A is at the head of the queue.

The scheduler then transfers the process identifier of the process A to the done state 6 and the simulation system advances simulated time by the sleep time of the process A, from $T_o$ to $T_o+4$ microseconds. The scheduler then transfers the process descriptor of the process B, the next process descriptor at the head of the queue for the sleep state 8, to the queue for the execution state 4. The scheduler then transfers the process descriptor of the process B to the done state while the simulation system advances the simulated time by the sleep time of the process B, from $T_o+4$ microseconds to $T_o+12$ microseconds.

The scheduler then transfers the process descriptor of the process C, the last process descriptor in the queue of the sleep state 8, to the execution state 4. The scheduler then transfers the process descriptor of the process C from the queue of the execution state 4 to the done state 6 while the simulation system advances the simulated time by the sleep time of the process C, from $T_o+12$ microseconds to $T_o+14$ microseconds.

Figure 4:
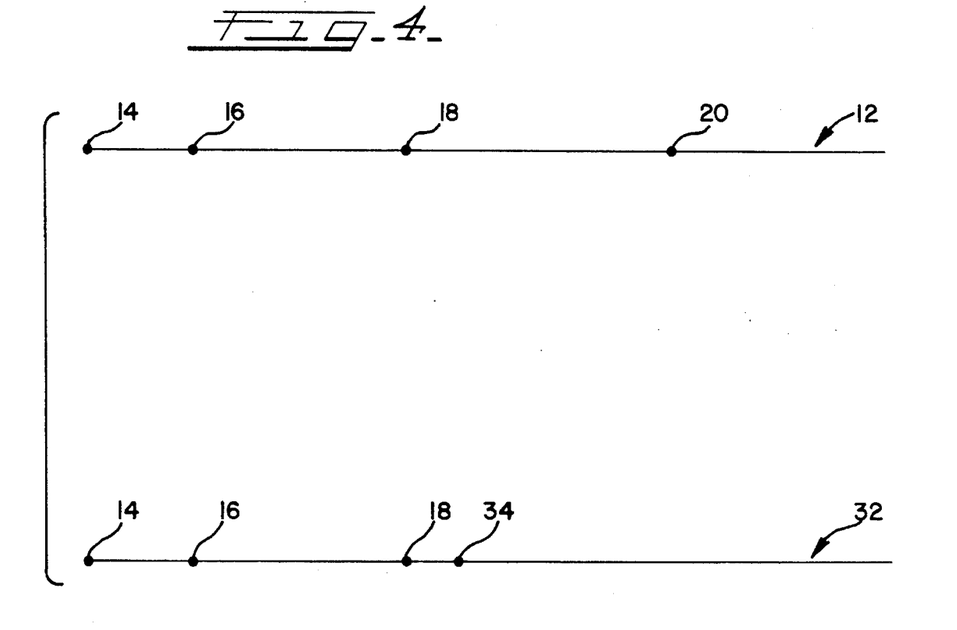
FIG. 4 is a graphical representation of actual and simulated execution times of a program executed on a host processor for a targeted multiple processor system with processors having the same speed as the host processor.

FIG. 4 is a graphical representation of the virtual and the simulated program execution times on the host processor. Line 12 represents the real time program execution of the simulated program on the host processor, just as in the example described above. Likewise, the points 14, 16, 18 and 20 represent the same real time values $T_o$, $T_o+4$ microseconds, $T_o+12$ microseconds and $T_o+22$ microseconds as described above, since the host processor sequentially processes the process A first, then the process B, and finally the process C. However, in this case, after the process A is completed at the point 16, the simulation system measures the 4 microsecond period and puts the parent process A to sleep. Then the process B starts at the point 16 and continues to the point 18, and the simulation system measures the elapsed period for the process B of 8 microseconds. The simulation system recognizes that since there are three processors in the target system that is being simulated, the process C can be simulated to run in parallel with the process B. As a result, although the process C is still executed on the host processor after the process B, the simulation system arranges the simulated execution times of both the process B and the process C to begin after the execution of the process A is complete. This is shown on line 32, which is a graphical representation of the simulated program execution on the host as a function of time. The parent program execution time is measured by the simulation system to time for 4 microseconds, starting with the time $T_o$ represented by the point 14 and extending to the time $T_o+4$ represented by the point 16, just as for the first example described above. The process B and process C are both simulated to begin at the time $T_o+4$ microseconds after the completion of the process A. Therefore, the process B is still represented to be executed from the time $T_o+4$ microseconds represented by the point 16 to the time $T_o+12$ microseconds represented by the point 18. However, the process C is simulated to start from the time $T_o+4$ microseconds represented by the point 18 as well, so that the process C continues to be executed only to the time $T_o+14$ microseconds, represented by point 34. Thus, the total time predicted to execute this program on the multiple processor target system shrinks from 22 to 14 microseconds, even though the host processor on which the simulation is performed has the same speed. With the simulation system according to the present invention, code performance of the simulated program is measured instead of just estimates of simulated activities, such as memory access time. While each individual process is of known length, the dynamic combination of these processes is not. It is the dynamic combination of processes that the embedded simulation measures and predicts.

Figure 5:
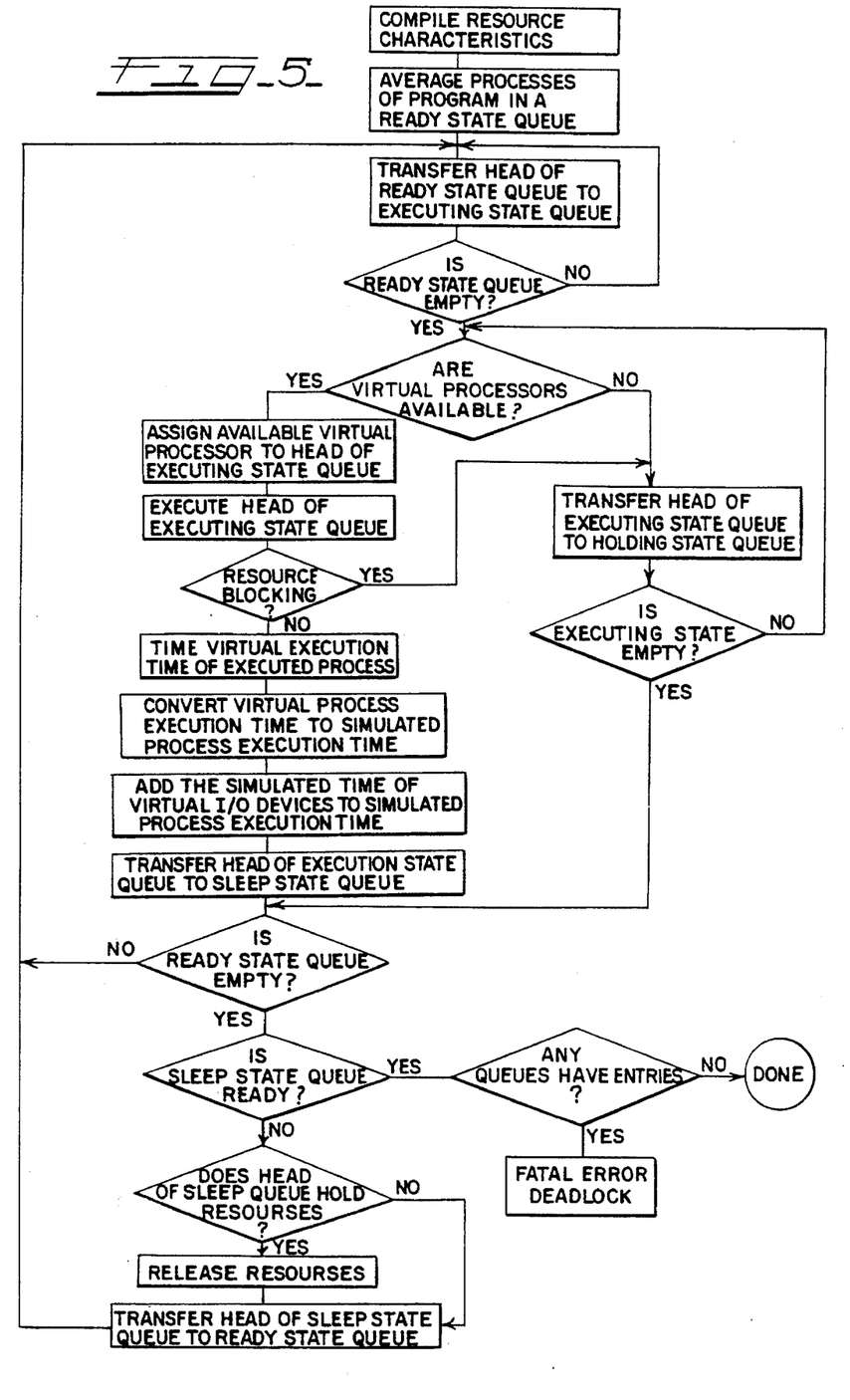
FIG. 5 is a flow chart of the methodology of the entire simulation process according to the present invention.

A flow chart of the methodology of the entire simulation process is shown in FIG. 5. The resource characteristics of the target data processing system, including the number of virtual processors, their respective speeds and the estimated access, retrieval and transfer times for the virtual I/O devices are compiled in the simulation system boot file. The target system resource characteristics can be configured by reading them from the boot file dynamically during system execution so that different target system configurations can be run as consecutive experiments to determine the most suitable target system configuration. The component processes of the program to be run in simulation are consecutively arranged in the queue for the ready state 2 by the scheduler.

The processes are transferred to the queue for the executing state 4 as each of them reach the head of the queue for the ready state 2. One of the available virtual processors is assigned to each of the processes as they reach the head of the queue for the executing state 4. The processes so assigned with simulated processors are then executed. The virtual process execution time of each of these processes is measured by the high resolution virtual timer system. If resource blocking occurs, such as due to unavailability of one of the I/O devices, the process being executed is returned to the holding state queue.

As these processes are each timed, the virtual process execution time so measured is converted to simulated process execution time by scaling the measured virtual process execution time by the ratio of the speed of the simulated processor assigned to the process to the speed of the host processor on which the simulation system runs. The simulated times of any corresponding virtual I/O devices are then added to the process time. As each process has its simulated process time so computed, it is transferred to the queue for the sleep state 8. If no virtual processors are available for the processes that reach the head of the queue for the executing state 4, these processes are transferred to the queue for the holding state 10 until virtual processors are available for assignment.

After all the processes are transferred to either the queue for the sleep state 8 or the queue for the holding state 10, each of the processes in the queue for the sleep state 8 is transferred to the queue for the ready state 2 by the scheduler until the queue for the sleep state 8 is empty. The simulated program time for the program is advanced as each process reaches the head of the queue for the execution state 8 which has a corresponding simulated process execution time.

If the process is to run independently of any of the other processes, the simulated program is advanced by the simulated process time of the process, its simulated processor is released and the process is then transferred to the queue of the done state 6 by the scheduler. If the process is to run concurrently with other processes which have not already advanced the simulated program time, the simulated program time is advanced by the simulated process time of the process. Its simulated processor is then released and the process is then transferred to the queue for the done state 6 by the scheduler.

If the process is to run concurrently with other processes which have already advanced the simulated program time, the simulated program time is advanced by the increase of simulated process execution time of the process over that of the other processes that have advanced the program execution time. Its simulated processor is then released and the process is then transferred to the queue for the done state 6 by the scheduler.

As formerly assigned virtual processors are released by the executed processes transferred to the queue of the done state 6, they are reassigned to each of the remaining processes in the queue of the holding state 10 as they reach the head of the queue. The processes are transferred from the head of the queue for the holding state 10 to the queue for the ready state 2 as the released virtual processors are reassigned to them. After the processes in the queue for the execution state 4 have all been transferred to the queue for the done state 6, each of the processes in the queue for the ready state 2 are transferred to the queue for the execution state 4 as they reach the head of the queue for the ready state 2. The processes in the queue for the execution state 4 are then executed as they each reach the head of the queue. The virtual process execution time of each of these processes is measured by the high resolution timer system. Processes may also be created dynamically by other processes. At creation they are put in the queue for the ready state 2 and proceed as described above.

As these processes are each timed, the virtual process execution time so measured is converted to simulated process execution time by scaling the measured virtual process execution time by the ratio of the speed of the simulated processor reassigned to the process to the speed of the host processor on which the simulation system runs. The simulated times of any corresponding virtual I/O devices are then added to the process time. The simulated program time for the program is advanced as each process reaches the head of the queue for the execution state 4 which has a corresponding simulated process execution time, as described above.

In this way, the simulated program execution time is incremented process by process according to the speed of the simulated processor and the simulated execution times of the simulated I/O devices assigned to each process, and the simulated program time is advanced according to the concurrent simulated execution of other processes in the program.

Thus, there has been described herein a technique for simulating programs on a single processor host workstation to accurately predict their performance on a target system including multiple processors, including timing interdependent processes and arranging and paralleling the measured times. It will be understood that various changes in the details, arrangements and configurations of parts and system which have been herein described and illustrated in order to explain the nature of the invention may be made by those skilled in the art within the principle and scope of the present invention as expressed in the appended claims.

We claim:

1. A method for evaluating the execution of a computer program designed to execute on a target computer system using a host computer system having a single processor unit to simulate said target computer system and execute said computer program, comprising the steps of:

configuring system characteristics for said target computer system including characteristics of simulated processors and simulated I/O devices, said target system having a single processor configuration according to one user defined selection and said target system having a multiple processor configuration according to another user defined selection;

executing component processes of said computer program on said host computer with assigned ones of said simulated processors and simulated I/O devices according to said system characteristics for said target computer system;

measuring the virtual process execution time of each of said component processes on said single processor of said host computer system for each of said executed component processes;

converting the measured virtual process execution time of each of said component processes to simulated process execution time proportional to the ratio of the speed of each corresponding one of said simulated processors to the speed of said single processor of said host computer system;

adding the simulated time of each corresponding one of said simulated I/O devices to said simulated process execution time for each of said executed component processes; and advancing simulated program execution time by said simulated process execution time of each of said executed component processes according to the simulated concurrence of execution of each of said component processes with other ones of said component processes.

2. The method recited in claim 1, wherein said step of configuring system characteristics for said target computer system comprises the step of specifying the number of said simulated processors and their respective speeds.

3. The method recited in claim 2, wherein said step of configuring system characteristics comprises the step of specifying estimated access, retrieval and transfer times for said simulated I/O devices.

4. The method recited in claim 3, wherein said step of adding the simulated time of said simulated I/O devices to said simulated process execution time of each of said executed component processes comprises adding the access, retrieval and transfer delay times of said simulated I/O devices to the simulated process execution time of each one of said component processes.

5. The method recited in claim 1, wherein said step of advancing said simulated program execution time by the simulated process execution time of each of said component processes that are to run independently comprises the step of adding said simulated process execution time of each of said independently running component processes to said simulated program execution time.

6. The method recited in claim 1, wherein said step of advancing said simulated program execution time by the simulated process execution time of each of said component processes which currently run with other ones of said component processes that have not already advanced said simulated program execution time comprises the step of adding said simulated process execution time of each of said concurrently running component processes to said simulated program execution time.

7. The method recited in claim 1, wherein said step of advancing said simulated program execution time by the increase of the simulated process execution time of each of said component processes over that of other ones of said component processes that have already advanced said simulated program execution time comprises the step of adding said simulated process execution time of each of said concurrently running component processes to said simulated program execution time.

8. A method for evaluating the execution of a computer program designed to execute on a target computer system using a host computer system having a single processor unit to simulate said target computer system and execute said computer program, comprising the steps of:

configuring system characteristics for said target computer system including characteristics of simulated processors and simulated input/output devices for said target computer system, a single processor configuration according to one user defined selection and said target system having a multiple processor configuration according to another user defined selection;

arranging said computer program into a series of component processes;

sequentially assigning one of said simulated processors to each of said component processes until all of said simulated processors are assigned;

sequentially executing said component processes which have said assigned simulated processors on said host computer;

measuring the virtual process execution time of said executed component processes with said assigned simulated processors and simulated I/O devices;

converting said virtual process execution time of said executed component processes with said assigned simulated processors and simulated I/O devices to simulated process execution time proportional to the ratio of the speed of the assigned one of said simulated processors to the speed of said single processor of said host computer system for each of said executed component processes;

adding the simulated time of said simulated I/O devices to said simulated process execution time of each of said executed component processes;

reassigning said simulated processors released from said executed ones of said component processes with said assigned simulated processors released from said executed ones of said component processes with said assigned simulated processors to the remainder of said component processes without said assigned simulated processors and simulated I/O devices;

executing those of said component processes with said reassigned simulated processors and simulated I/O devices;

measuring the virtual process execution time of said component processes with said reassigned simulated processors and simulated I/O devices;

converting said virtual process execution time of said executed component processes with said reassigned simulated processors and simulated I/O devices to simulated process execution time proportional to the ratio of the speed of the reassigned one of said simulated processors to the speed of said single processor of said host computer system for each of said executed component processes;

adding the simulated time of the selected ones of said simulated I/O devices to said simulated process execution time of each of said reassigned component processes;

advancing simulated program execution time by the simulated process execution time of each of said component processes that are to run independently of the other of said component processes in simulation on said target computer system.

9. The method recited in claim 8, wherein said step of configuring system characteristics for said target computer system comprises compiling the number of said simulated processors and their respective speeds.

10. The method recited in claim 9, wherein said step of configuring system characteristics comprises compiling estimated access, retrieval and transfer times for said simulated I/O devices.

11. The method recited in claim 8, wherein said step of arranging said computer program into a series of component processes comprises the step of placing said component processes in a ready state queue.

12. The method recited in claim 11, wherein said step of sequentially assigning one of said simulated processors and said selected simulated I/O devices to each of said component processes comprises assigning each of said simulated processors to each one of said component processes at the head of said ready state queue.

13. The method recited in claim 8, wherein said step of executing those of said component processes that have assigned simulated processors comprises the step of assigning said assigned component processes to an executing state queue.

14. The method recited in claim 13, wherein said step of measuring the virtual process execution time of said component processes with assigned simulated processors comprises measuring the virtual process execution time of each one of the said component processes with assigned simulated processes at the head of said executing state queue.

15. The method recited in claim 13, wherein said step of converting said virtual process execution time of said executed component processes with said assigned simulated processors comprises converting said virtual process execution time of each of said component processes at the head of said executing state queue.

16. The method recited in claim 13, wherein said step of adding the simulated time of said simulated I/O devices to said simulated process execution time of each of said executed component processes comprises adding the access, retrieval and transfer delay times of said simulated I/O devices to the simulated process execution time of each one of said component processes at the head of said executing state queue.

17. The method recited in claim 8, wherein said step of executing those of said component processes which have assigned simulated processors further comprises the step of placing the remainder of said component processes in a holding state queue, and said step of reassigning said remaining component processes comprises reassigning said released simulated processors to each one of said remainder of said component processes at the head of said holding state queue.

18. The method recited in claim 8, wherein said step of executing those of said component processes with said reassigned simulated processors comprises the step of placing said component processes with said reassigned simulated processors in an executing state queue.

19. The method recited in claim 18, wherein said step of measuring the process execution time of said executed component processes with said reassigned simulated processors comprises measuring the virtual process execution time of each one of said component processes at the head of said executing state queue.

20. The method recited in claim 18, wherein said step of convening said virtual process execution time of said executed component processes with said reassigned simulated processors comprises convening said virtual process execution time of each of said component processes at the head of said execution state queue.

21. The method recited in claim 18, wherein said step of adding the simulated of time said simulated I/O devices to said simulated process execution time of each of said reassigned component processes comprises adding the access, retrieval and transfer delay times of said simulated I/O devices to each one of said component processes at the head of said executing state queue.

22. The method recited in claim 8, wherein said step of advancing said simulated program execution time by the simulated process execution time of each of said component processes that are to run independently comprises the step of adding the simulated process execution time of each of said independently running component processes to said simulated program execution time that are assigned to a done state.

23. The method recited in claim 22, wherein said step of advancing said simulated program execution time by the simulated process execution time of each of said component processes which currently run with other ones of said component processes that have not already advanced, said simulated program execution time comprises the step of adding said simulated process execution time of each of said concurrently running component processes to said simulated program execution time that are assigned to said done state.

24. The method recited in claim 23, wherein said step of advancing said simulated program execution time by the increase of the simulated process execution time of each of said component processes over that of other ones of said component processes that have already advanced said simulated program execution time comprises the step of adding said simulated process execution time of each of said concurrently running component processes to said simulated program execution time that are assigned to said done state.

25. A method for evaluating the execution of a computer program designed to execute on a target computer system using a host computer system having a single processor unit to simulate said target computer system and execute said computer program, comprising the steps of:

configuring system characteristics for said target computer system including characteristics of simulated processors and simulated input/output devices for said target computer system, said system characteristics comprising the number of said simulated processors and their speeds and the estimated access, retrieval and transfer times for said simulated I/O devices, said target system having a single processor configuration according to one user defined selection and said target system having a multiple processor configuration according to another user defined selection;

arranging said computer program into a series of component processes placed in a ready state queue;

sequentially assigning one of said simulated processors to each of said component processes as they reach the head of said ready state queue and transferring them to an executing state queue;

sequentially executing on said host computer those of said component processes which have said assigned simulated processors as they reach the head of said executing state queue and transferring the remainder of said component processes to a holding state queue;

measuring the virtual process execution time of said executed component processes with said assigned simulated processors and simulated I/O devices as said component processes are executed at the head of said executing state queue;

converting said virtual process execution time of said executed component processes with said assigned simulated processors and simulated I/O devices to simulated process execution time as said component processes are executed at the head of said executing state queue;

adding the simulated time of the selected ones of said simulated I/O devices assigned to said simulated process time of each of said executed component processes as said component processes are executed at the head of said executing state queue;

reassigning said simulated processors from said executed ones of said component processes with said assigned simulated processors at the head of said executing state queue to the remainder of said component processes as they reach the head of said holding state queue and transferring them to the ready state queue;

sequentially arranging said reassigned component processes in said executing state queue as they reach the head of said ready state queue;

sequentially executing on said host computer those of said component processes in said executing state queue as they reach the head of said ready state queue;

measuring the virtual process execution time of said component processes with said reassigned simulated processors and simulated I/O devices as said component processes are executed at the head of said executing state queue;

convening said virtual process execution time of said executed component processes with said assigned simulated processors and simulated I/O devices as said component processes are executed at the head of said executing state queue;

adding the simulated time of said simulated I/O devices to said simulated process execution time of each of said executed component processes as each of said component processes are executed at the head of said executing state queue;

advancing simulated program execution time by the simulated process execution time of each of said component processes assigned to a done state that are to run independently of the other of said component processes in simulation on said target computer system;

advancing said simulated program execution time by the simulated process execution time of each of said component processes assigned to a done state that are to run concurrently in simulation on said target computer system with other ones of said component processes that have not already advanced said simulated program execution time; and advancing said simulated program execution time by the increase of the simulated process execution time of each of said component processes assigned to a done state over that of other ones of said component processes that are to run concurrently in simulation on said target computer system that have already advanced said simulated program execution time.

* * * * *